United States Patent
Eckel et al.

[11] Patent Number: 5,913,392
[45] Date of Patent: Jun. 22, 1999

[54] ACTIVE VIBRATION CANCELER

[75] Inventors: Hans-Gerd Eckel, Laudenbach; Anja Kunkel, Siedelsbrunn, both of Germany

[73] Assignee: Firma Carl Freudenberg, Weinheim, Germany

[21] Appl. No.: 08/800,434

[22] Filed: Feb. 18, 1997

[30] Foreign Application Priority Data

Feb. 15, 1996 [DE] Germany .......................... 196 05 551

[51] Int. Cl.$^6$ ............................... F16F 7/10; F16F 15/03
[52] U.S. Cl. .......................... 188/378; 188/379; 267/136; 267/158
[58] Field of Search ...................... 188/378, 379, 188/380; 267/267, 266.7, 136, 158–165, 50; 248/550, 636, 562; 310/51, 90.5; 318/116, 629; 192/84.94, 200; 335/274, 222, 277; 367/188, 183, 187; 73/652

[56] References Cited

U.S. PATENT DOCUMENTS

| | | | |
|---|---|---|---|
| 2,678,209 | 5/1954 | Searle | 267/50 |
| 3,738,445 | 6/1973 | Wilson et al. | 267/160 |
| 4,019,750 | 4/1977 | Wiegard | 267/160 |
| 5,119,915 | 6/1992 | Nelson | 267/158 |
| 5,520,375 | 5/1996 | Leibach et al. | 267/140.14 |
| 5,555,222 | 9/1996 | Woo | 267/161 |

FOREIGN PATENT DOCUMENTS 0 587 986 A1  9/1992  European Pat. Off. .

*Primary Examiner*—Douglas C. Butler
*Attorney, Agent, or Firm*—Kenyon & Kenyon

[57] ABSTRACT

An active vibration canceler, including a canceler mass that is attached by a spring device to a supported bearing. The canceler mass is movable by a plunger coil arrangement and a permanent magnet so as to result in at least partial suppression of relative movements of the supported bearing in at least one frequency range. The spring device joins the canceler mass and the supported bearing for relative movement in one direction. The spring device includes at least three leaf springs arranged in at least two planes, which leaf springs, in the idle position, extend circumferentially in the same direction.

13 Claims, 3 Drawing Sheets

ACTIVE VIBRATION CANCELER

BACKGROUND OF THE INVENTION

1. Field of the Invention

The present invention relates to an active vibration canceler, which includes a canceler mass that is attached by a spring device to a supported bearing, in which the canceler mass is movable by a plunger coil/permanent magnet arrangement so as to result in at least partial suppression of relative vibrational movements of the supported bearing in at least one frequency range.

2. Description of the Prior Art

A vibration canceler is shown in European Unexamined Application 0 587 986. The spring device in that application includes a rubber element that is enclosed in the manner of a hydraulic fluid in a cavity, which at the same time serves as linear converter between a large input drive piston and a small output drive piston. The input and output drive pistons described in that application divide the cavity, defined by rigid walls, into two subregions opposite one another. They are joined to the rubber element by vulcanization while the rubber is shaped and consolidated. Because of this method of fabrication, subsequent replacement of the rubber element is not possible, which complicates adaptation to specific application conditions.

One essential problem of the known vibration canceler of the above application is that, because of its material-related properties, the rubber element used as the spring element has a high level of self-damping. Most of the energy stored in the input drive piston is thus lost, and is not available in the region of the output drive piston.

SUMMARY OF THE INVENTION

It is the object of the present invention to develop a vibration canceler that has a simple design, while obtaining a considerably improved energy yield.

The objects of the present invention are achieved by using a spring device having at least three leaf springs arranged in at least one plane, which leaf springs, in the idle position, extend circumferentially in the same direction.

In an advantageous embodiment, provision is made for the leaf springs to be fastened at opposite ends to either a canceler mass projection or a supported bearing projection, both of which bearings extend perpendicular to the direction of movement of the canceler mass. Suitable attachment points on the bearings can be easily produced particularly, for example by indirect shaping during production of the canceler mass or supported bearing in the a casting or punching process. During subsequent installation, all that is needed is to join the leaf springs to the respective projections, for example by mutual threading, clamping, riveting, or adhesive bonding.

The leaf springs can overlap the canceler mass projection with a stop in the circumferential direction in such a way that the stop can be brought into engagement with a counterstop of the bearing projection. In this manner the amplitude of the vibration-related deflection movements of the canceler mass can easily be limited to a value at which overstressing of the spring device or collision between the canceler mass and the plunger coil can be prevented.

According to an advantageous embodiment, it has proven successful to provide at least two groups of leaf springs, extending parallel to one another, which are spaced apart from one another in the direction of movement of the canceler mass and are equipped with stops that can be brought into engagement with counterstops on the supported bearing. The radial clearance inside the plunger coil/ permanent magnet arrangement can thereby be kept particularly narrow with no likelihood of contact between the plunger coil and the magnet core. This is highly advantageous in terms of good energy yield in the plunger coil drive region. Tilting of the magnet core in the plunger coil can no longer occur.

The end stops and/or the counterstops can be equipped, on the sides facing one another, with a flexible stop buffer, in order to prevent impact noise. Suitable stop buffers can be made of rubber, and can be joined to the end stops and/or counterstops by being directly vulcanized or adhesively bonded thereon.

The leaf springs can be made of any appropriate material. Metallic materials or fiber-reinforced plastics are preferably used.

The leaf springs can be constructed of multiple individual springs stacked into a spring packet. Given the leaf spring length provided in the design and the maximum possible spring travel, the allowable stress on the spring material determines the thickness of the individual springs.

The required number of individual springs are stacked into a spring packet in order to set a defined spring rate for the leaf springs.

The leaf springs can be equipped, at least in one region, with a vibration-damping coating, for example a coating consisting of grease that has a drop point above 153 degrees C. This coating suppresses natural vibrations of the leaf springs during use as intended. This coating is highly advantageous in terms of achieving good operating characteristics. The comparatively high temperature resistance is advantageous for common applications in the automotive sector, and is required for proper function in various climates.

The arrangement of at least three leaf springs in each of two planes, all arranged in the same direction circumferentially, leads, especially when spring travel is long, to a rotation about the center axis of the canceler mass relative to the supported bearing. This movement does not, however, impair parallel guidance of the canceler mass with respect to the supported bearing.

Without requiring the use of further guide elements, it is therefore completely impossible for the canceler mass to move with respect to the supported bearing except on a previously-defined path. As a result, a particularly narrow air gap can be achieved in the region of the plunger coil arrangement, which is highly advantageous in terms of good energy yield.

BRIEF DESCRIPTION OF THE DRAWINGS

The subject of the present invention is illustrated below with reference to the drawings, in which.

DETAILED DESCRIPTION OF THE INVENTION

Figure 1:
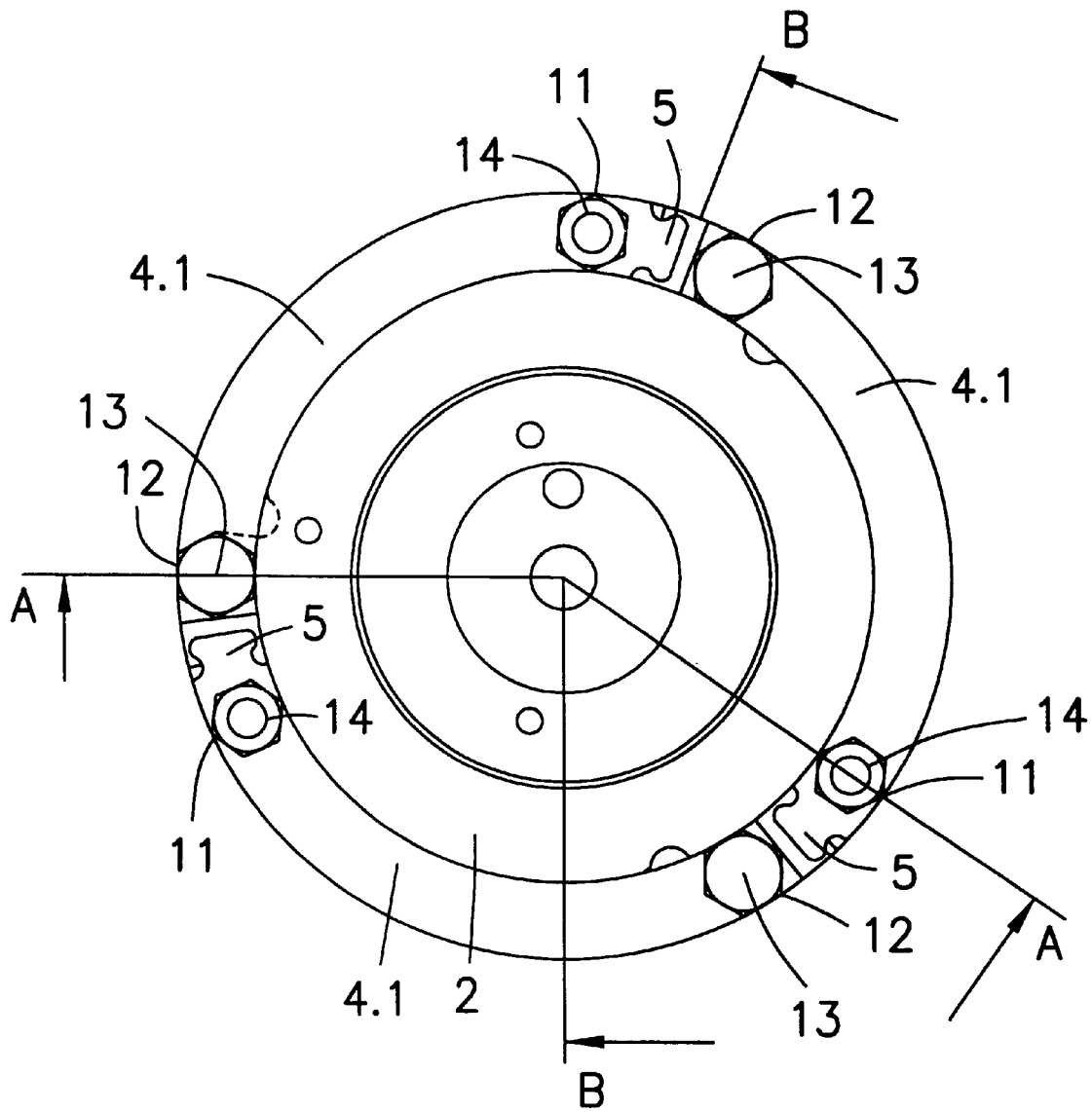
FIG. 1 shows a vibration canceler viewed from above.

The vibration canceler depicted in the drawings includes a canceler mass 1 that is attached by a spring device to a supported bearing 2, such that canceler mass 1 can be moved back and forth by a plunger coil 3/permanent magnet 9 arrangement so as to result in at least partial suppression of relative movements of supported bearing 2 in that direction, in at least one frequency range. The spring device joins canceler mass 1 and supported bearing 2 to one another in a resilient fashion. In the exemplified embodiment shown in FIGS. 1–3, the spring device includes two sets of three leaf springs 4.1, 4.2, which in the idle position extend perpendicular to the direction of movement of the canceler mass 1, and all extend in the same direction circumferentially. A larger number of leaf springs 4.1, 4.2 can easily be used; the three shown in the preferred embodiment are merely one option. It is important, however, that the length of the leaf springs be relatively large in order to guarantee a sufficiently long deflection movement for the canceler mass relative to the supported bearing.

Figure 2:
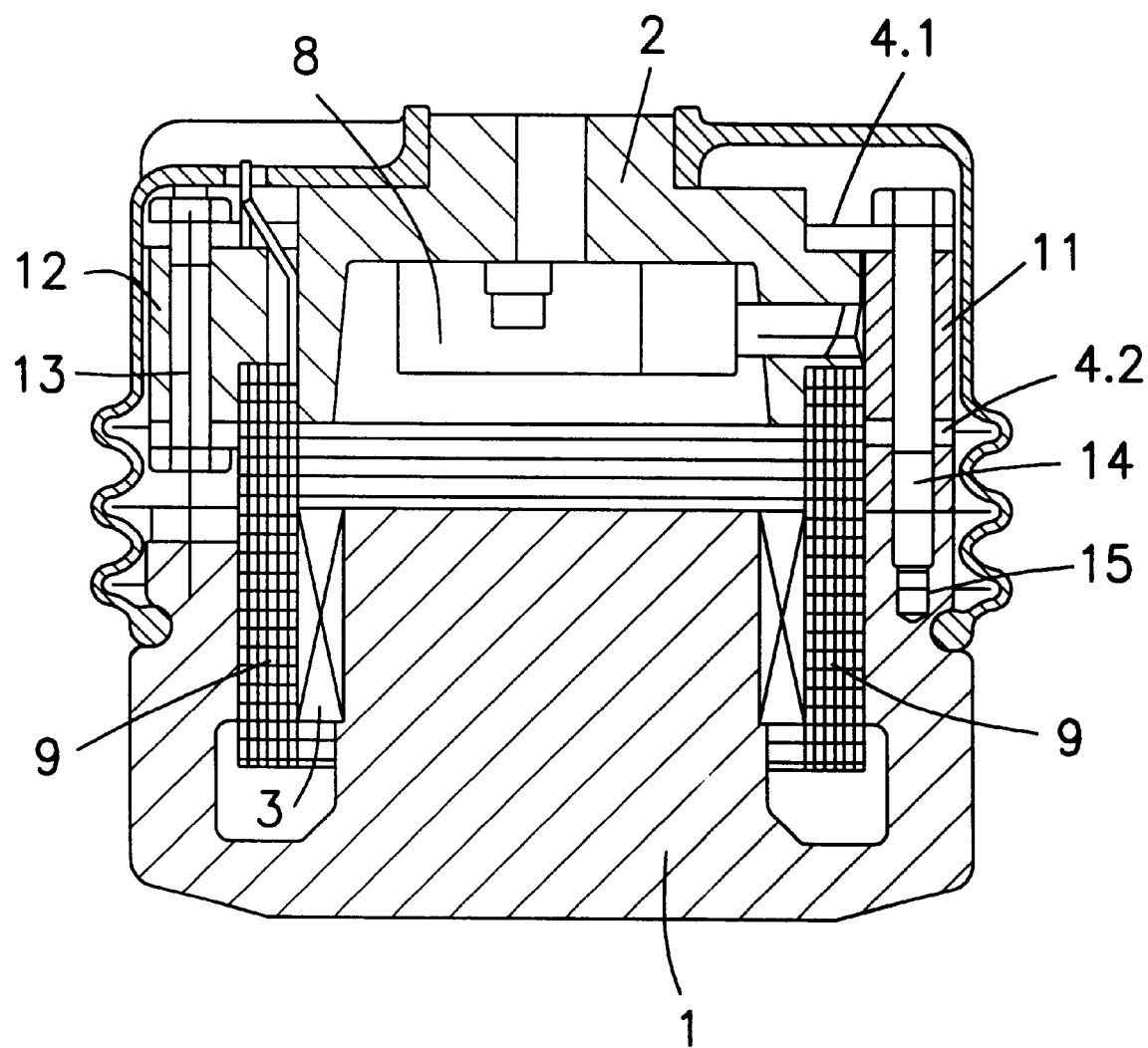
FIG. 2 shows the vibration canceler according to FIG. 1 in a longitudinally sectioned depiction, sectioned along plane A—A.
Figure 3:
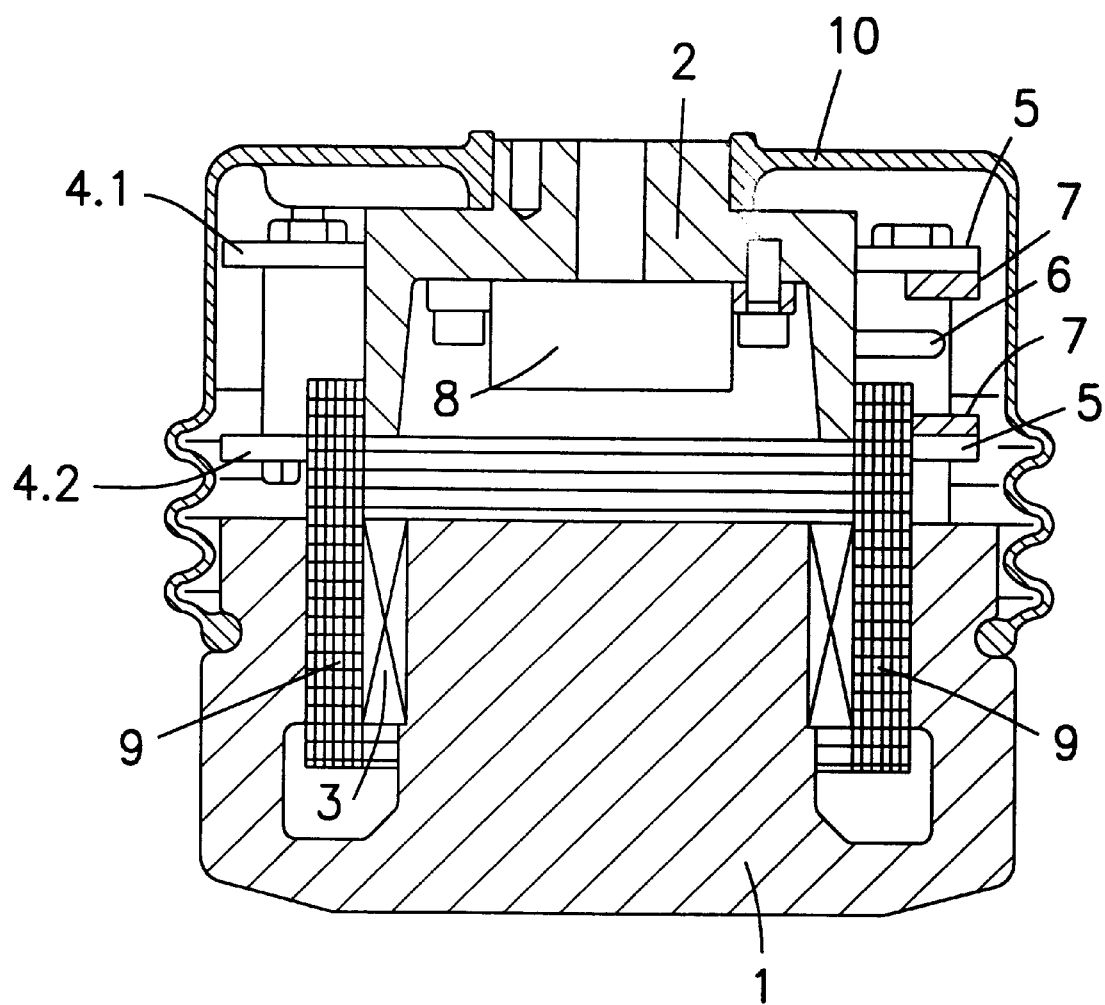
FIG. 3 shows the vibration canceler according to FIG. 1 in a longitudinally sectioned depiction, sectioned along a plane B—B.

The leaf springs 4.1, 4.2 are fastened on one end to a canceler mass projection 11 and on the other end to a supported bearing projection 12, both of which extend perpendicular to the direction of movement of canceler mass 1. Fastening of leaf springs 4.1, 4.2 to projections 11, 12 is effected with threaded pins 13, 14 which pass through holes in the leaf springs, and are threaded into a threaded hole 15 of the canceler mass projection 11 or supported bearing projection 12 (FIGS. 1, 2).

Leaf springs 4.1, 4.2 overlap the canceler mass projection 11 with a stop 5 in the circumferential direction, such that stop 5 can be brought into engagement with a counterstop 6 on the supported bearing 2. The maximum deflection movement of the canceler mass 1 is thereby limited to a fixed value.

Also provided in the exemplified embodiment shown are two groups of leaf springs 4.1, 4.2, which are spaced apart from one another in the direction of movement and are equipped with stops 5 which can be brought into engagement with counterstops 6 of the supported bearing 2. Canceler mass 1 is thereby guided very precisely parallel to the direction of movement, making it possible to reduce the width of the air gap between the plunger coil 3 and the permanent magnet 9 to an extremely small value. This is highly advantageous in terms of achieving good efficiency in the plunger coil 3/permanent magnet 9 arrangement. A direct test contact between the plunger coil 3 and the permanent magnet core 9 is not present. Relative displacements of the canceler mass 1 therefore do not need to overcome adhesion friction forces.

Deflection movements of the canceler mass 1 in the direction of movement require a certain relative back-and-forth movement. These can, however, easily be accepted since there is no impairment of any other function.

With the use of two groups of leaf springs 4.1, 4.2, whose stops 5 are adjacent, on either side, to the counterstops 6 of the supported bearing 2, the maximum relative movement capability of the canceler mass 1 in both directions is limited to a fixed value.

In order to prevent impact noise when extreme movements occur, in the exemplified embodiment shown, stops 5 are equipped, on the side facing the respective counterstop 6, with a flexible stop buffer 7, made, for example, of rubber. Not visible in the drawings is a solid coating on leaf springs 4.1, 4.2. This coating is not very thick. Its purpose is to prevent the occurrence of resonance vibrations of the leaf springs 4.1, 4.2.

When dimensions of the device of the present invention are large, it may be advantageous to stack multiple leaf springs in succession in the direction of movement. The spring elasticity can thereby be adjusted to desired values.

In the exemplified embodiment shown, a sensor 8 is mounted in the interior of supported bearing 2, making it possible to detect relative movements of supported bearing 2, or of an accessory to which supported bearing 2 is rigidly joined, during use as intended. The detected movements are converted by the sensor 8 into electrical signals with which plunger coil 3 can be activated so as to result in a deflection movement of canceler mass 1 that is opposite in phase to the respective movement of supported bearing 2. This driving of the canceler mass using a coil 3 and a permanent magnet 9 is known in the art. The vibrations acting in supported bearing 2 can thereby be at least partly reduced.

In the exemplified embodiment shown, all parts that are essential for operation are protected by a water-tight bellows 10 which joins canceler mass 1 and supported bearing 2 in water-tight fashion. Bellows 10 is omitted from FIG. 1 for reasons of clarity. Bellows 10 is preferably produced from a low-damping elastomer.

We claim:

1. An active vibration canceler, comprising:

a canceler mass;

a coil activated by electrical signals;

a supported bearing, the canceler mass being movable relative to the supported bearing by the coil so as to result in at least partial suppression of relative movements of the supported bearing in at least one frequency range;

a spring device connecting the canceler mass to the supported bearing, the spring device connecting the canceler mass and the supported bearing resiliently, the spring device including at least three leaf springs arranged in at least one plane, the leaf springs, in an idle position, extending circumferentially in a common direction and substantially perpendicular to direction of movement of the canceler mass.

2. The active vibration canceler of claim 1, wherein:

the spring device comprises two planes of at least three leaf springs.

3. The vibration canceler of claim 1, wherein:

the leaf springs are fastened at one end to a canceler mass projection and on the other end to a supported bearing projection.

4. The vibration canceler of claim 1, wherein:

the leaf springs comprise a spring packet.

5. The vibration canceler of claim 1, wherein:

the leaf springs include a vibration-damping coating.

6. The vibration canceler of claim 5 wherein:

the coating comprises grease that has a drop point above 153 degrees C.

7. The vibration canceler of claim 1, further comprising:

a sensor, the sensor sensing movement of the supported bearing.

8. An active vibration canceler, comprising:

a canceler mass;

a supported bearing, the canceler mass being movable relative to the supported bearing by a coil so as to result in at least partial suppression of relative movements of the supported bearing in at least one frequency range;

a spring device connecting the canceler mass to the supported bearing, the spring device joining the canceler mass and the supported bearing resiliently to one another, the spring device comprising at least three leaf springs arranged in at least one plane, the leaf springs, in an idle position, extending circumferentially in a common direction and substantially perpendicular to direction of movement of the canceler mass, wherein the leaf springs are fastened at one end to a canceler maps projection and on the other end to a supported bearing projection and wherein each of the leaf springs comprise a stop overlapping the canceler mass projection with a stop in the circumferential direction, and wherein the supported bearing comprises a counterstop, the stops engaging the counterstop upon large deflections of the canceler mass.

9. The vibration canceler of claim 8, wherein:

the stops comprise, on sides facing the counterstop, flexible stop buffers.

10. A method of actively canceling vibrations, comprising:

providing a canceler mass;

providing a supported bearing;

providing a coil;

connecting the canceler mass to the supported bearing using a resilient spring device including at least three leaf springs arranged in at least one plane, the leaf springs, in an idle position, extending circumferentially in a common direction and substantially perpendicular to direction of movement of the canceler mass; and moving the canceler mass relative to the supported bearing using the coil to at least partially suppress relative movements of the supported bearing in at least one frequency range.

11. The method of claim 10, further comprising:

proving stops and a counterstop; and engaging the stops with the counterstop upon large deflections of the canceler mass.

12. The method of claim 10, further comprising:

coating the leaf springs with a vibration-damping coating.

13. The method of claim 10, further comprising:

providing a sensor; and sensing movement of the supported bearing.

* * * * *

UNITED STATES PATENT AND TRADEMARK OFFICE
CERTIFICATE OF CORRECTION

PATENT NO. : 5,913,392
DATED : June 22, 1999
INVENTOR(S) :
Hans-Gerd ECKEL and Anja KUNKEL It is certified that error appears in the above-identified patent and that said Letters Patent is hereby corrected as shown below:

Column 5, line 6, change "maps projection" to -- mass projection --.

Signed and Sealed this

Eleventh Day of July, 2000

Attest:

Q. TODD DICKINSON

*Attesting Officer*              *Director of Patents and Trademarks*